(12) United States Patent
Kinder et al.

(10) Patent No.: US 10,442,411 B2
(45) Date of Patent: Oct. 15, 2019

(54) MANUALLY-OPERABLE HYDRAULIC STABILIZING SYSTEM

(71) Applicant: LIPPERT COMPONENTS, INC., Elkhart, IN (US)

(72) Inventors: Mark Kinder, Clarks Hill, IN (US); Robert L. Tiedge, Granger, IN (US); Nicholas Cornett, Granger, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 16/196,949

(22) Filed: Nov. 20, 2018

(65) Prior Publication Data

US 2019/0168720 A1  Jun. 6, 2019

Related U.S. Application Data

(63) Continuation-in-part of application No. 15/912,030, filed on Mar. 5, 2018.

(60) Provisional application No. 62/513,766, filed on Jun. 1, 2017, provisional application No. 62/478,271, filed on Mar. 29, 2017.

(51) Int. Cl.
| | |
|---|---|
| *B60S 9/10* | (2006.01) |
| *B60P 3/36* | (2006.01) |
| *B60G 17/056* | (2006.01) |
| *B60G 17/04* | (2006.01) |
| *B62D 63/08* | (2006.01) |

(52) U.S. Cl.
CPC ............ *B60S 9/10* (2013.01); *B60G 17/0408* (2013.01); *B60G 17/056* (2013.01); *B60P 3/36* (2013.01); *B60G 2202/413* (2013.01); *B60G 2500/203* (2013.01); *B62D 63/08* (2013.01)

(58) Field of Classification Search
CPC ................................. B60S 9/10; B60S 9/12
USPC .................. 280/763.1, 764.1, 765.1, 766.1
See application file for complete search history.

(56) References Cited

U.S. PATENT DOCUMENTS

| | | | | |
|---|---|---|---|---|
| 4,235,542 A | * | 11/1980 | Paterik, Jr. | B60S 9/12 254/423 |
| 4,318,550 A | * | 3/1982 | Jacobsen | B60S 9/12 280/766.1 |
| 4,515,520 A | * | 5/1985 | Parquet | E02F 9/085 212/304 |
| 4,928,488 A | * | 5/1990 | Hunger | B60S 9/12 254/93 VA |
| 5,011,119 A | * | 4/1991 | Harrington | B60D 1/66 254/420 |
| 5,013,011 A | * | 5/1991 | Halloway | B60S 9/12 254/423 |
| 5,176,391 A | * | 1/1993 | Schneider | B60G 17/005 180/41 |
| 5,230,499 A | * | 7/1993 | Schneider | B60S 9/12 254/423 |
| 5,312,119 A | * | 5/1994 | Schneider | B60G 17/005 280/755 |

(Continued)

*Primary Examiner* — Jeffrey J Restifo
(74) *Attorney, Agent, or Firm* — Barnes & Thornburg LLP (57) ABSTRACT

A stabilizing system includes a plurality of jacks, each operated by a corresponding hydraulic actuator. A hydraulic fluid transfer pump provides supplies hydraulic fluid to and receives hydraulic fluid from one or more pressure chambers of the actuator. A pilot-operated check or directional valve may be provided in fluid communication with one or more of the pressure chambers and configured to regulate the flow of hydraulic fluid to and from the pressure chamber.

17 Claims, 9 Drawing Sheets

(56) References Cited

U.S. PATENT DOCUMENTS

| | | | | |
|---|---|---|---|---|
| 5,401,046 A * | 3/1995 | Schwartz | ............... | B60S 9/12 254/419 |
| 5,580,095 A * | 12/1996 | Fukumoto | ............... | B60S 9/12 280/766.1 |
| 5,636,830 A * | 6/1997 | Chartrand | ............... | B60S 9/12 254/423 |
| 5,915,700 A * | 6/1999 | Schneider | ............... | B60S 9/12 280/6.15 |
| 6,196,586 B1 * | 3/2001 | Messenger | ............... | B66C 23/80 280/763.1 |
| 6,293,586 B1 * | 9/2001 | Ebinger | ............... | B60G 17/005 212/302 |
| 6,616,243 B2 * | 9/2003 | Russell | ............... | B60S 9/10 280/764.1 |
| 6,679,054 B2 * | 1/2004 | Doveri | ............... | B62H 1/02 280/301 |
| 6,877,773 B1 * | 4/2005 | Bibb | ............... | B66C 23/80 137/636.1 |
| 6,896,289 B2 * | 5/2005 | Gross | ............... | B60S 9/08 254/419 |
| 6,913,248 B1 * | 7/2005 | Schmitz | ............... | B60S 9/12 254/423 |
| 7,025,178 B2 * | 4/2006 | Wengelski | ............... | B60S 9/12 187/244 |
| 7,114,747 B2 * | 10/2006 | Dix | ............... | E02F 9/085 280/764.1 |
| 7,197,872 B2 * | 4/2007 | Satake | ............... | E02F 9/085 280/763.1 |
| 7,290,799 B2 * | 11/2007 | Santos | ............... | B60S 9/12 254/418 |
| 7,445,240 B2 * | 11/2008 | Ichimura | ............... | E02F 9/085 180/41 |
| 8,919,738 B2 * | 12/2014 | Daniel | ............... | B60S 9/12 254/418 |
| 9,050,947 B2 * | 6/2015 | Geates | ............... | B60S 9/12 |
| 9,073,516 B2 * | 7/2015 | Schwindaman | ............... | B60S 9/12 |
| 9,567,728 B2 * | 2/2017 | Colbert | ............... | E02F 9/085 |
| 10,086,805 B2 * | 10/2018 | Ahle | ............... | B60S 9/10 |

* cited by examiner

MANUALLY-OPERABLE HYDRAULIC STABILIZING SYSTEM

CROSS-REFERENCE TO RELATED APPLICATIONS

This application claims priority under 35 U.S.C. § 120 as a continuation-in-part of U.S. patent application Ser. No. 15/912,030, filed on Mar. 5, 2018, which claims benefit under 35 U.S.C. § 119 of U.S. Provisional Patent Application Nos. 62/478,271, filed on Mar. 29, 2017, and 62/513,766, filed on Jun. 1, 2017, the disclosures of all of which are incorporated herein by reference in their entireties. This application also claims priority under 35 U.S.C. § 119 of Australia Patent Application No. 2018217324, filed on Aug. 17, 2018, the disclosure of which is incorporated herein by reference in its entirety.

BACKGROUND AND SUMMARY OF THE DISCLOSURE

A recreational vehicle (RV) or trailer tends to rock on its suspension when persons move around inside the vehicle. It is known to provide such a vehicle with a stabilizing system to mitigate this tendency.

A typical stabilizing system may include four independent stabilizing jacks, each located at or near one of the four corners of the vehicle, namely, the left front, right front, left rear, and right rear corners. Each such stabilizing jack typically includes a base mounted to the vehicle and a foot extendable and retractable from the base. The foot may be extended to a deployed position in which the foot is engaged with the ground on which the vehicle is situated, and it may be retracted to a retracted (or travel) position in which the foot is sufficiently distanced from the ground to allow the vehicle to be readily towed or driven. Typically, each of the stabilizing jacks is independently and manually operated. As such, in order to deploy the stabilization system, a user must go to each of the four corners of the vehicle and manually deploy the jacks one at a time. This can be time-consuming and inconvenient, particularly in the dark and/or in inclement weather.

Also, known stabilizing systems tend to load the vehicle's frame unevenly and cause it to twist. Such twisting can place undesirable stresses on the vehicle's body, resulting in leaks and damage to body panels and seams.

DETAILED DESCRIPTION OF THE DRAWINGS

FIGS. 1-5 show an illustrative hydraulically-operated stabilizing system 10 or parts thereof according to the present disclosure. As shown, the system includes four stabilizing jacks 12 that may be installed on an RV, trailer, or other vehicle. (The jacks 12 may be referred to herein individually as the first through fourth jacks 12A-12D or the jacks 12n and collectively as the jacks 12n. Similarly, the various components of the jacks 12n may be referred to herein individually or collectively by appending their respective reference characters in a similar manner.) In other embodiments, the system 10 may include more or fewer than four jacks 12n.

Figure 1:
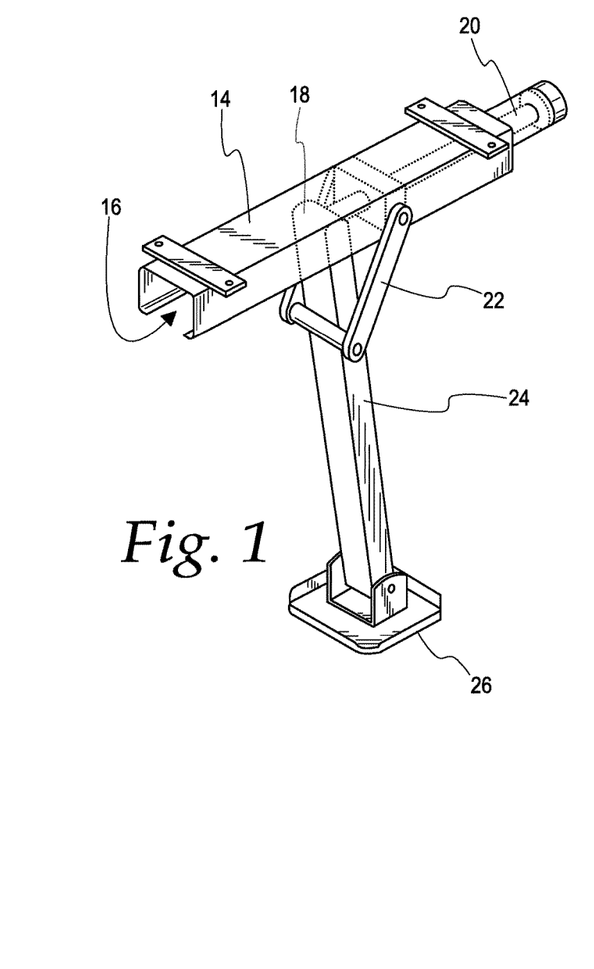
FIG. 1 is a perspective view of a hydraulically-operated stabilizing jack according to the present disclosure.
Figure 2:
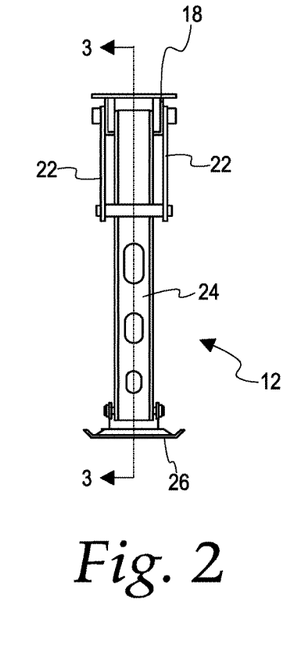
FIG. 2 is an end elevation view of the stabilizing jack of FIG. 1.
Figure 3:
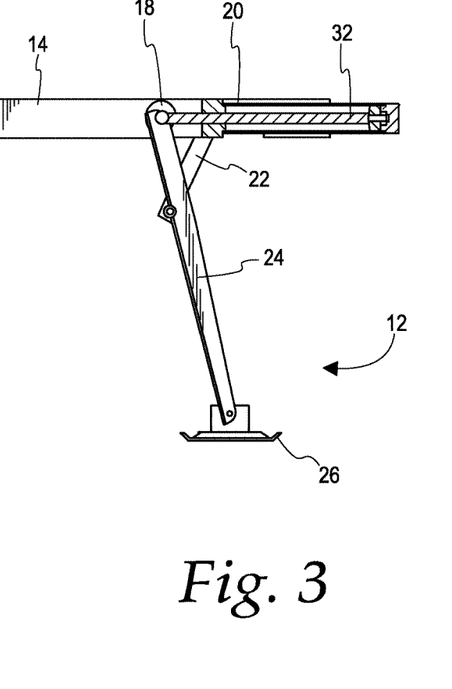
FIG. 3 is a cross-sectional side view of the jack of FIG. 1.

As best shown in FIGS. 1-3, each jack 12n incudes a base 14 configured for attachment to another structure, for example, an RV, a trailer, or another vehicle. The interior of the base 14 defines a channel 16 carrying a trunnion 18. A linear hydraulic actuator 20 is connected to the base 14. As will be discussed further below, the actuator 20 is operably connected to the trunnion 18 and is configured to selectively displace the trunnion within the channel 16. The trunnion 18 may be configured, for example, to slide within the channel 16. In an embodiment, the trunnion 18 may include wheels configured to roll within the channel 16. Each jack 12n also includes a strut (or struts) 22 pivotally connected to the base 14, and a leg 24 having a first end and a second end. The first end of the leg 24 is operably connected to the trunnion 18. The second end of the leg 24 may be connected to a foot 26, pivotally (as shown) or otherwise. The strut 22 is pivotally connected to the leg 24 between the first end and the second end of the leg.

Figure 4:
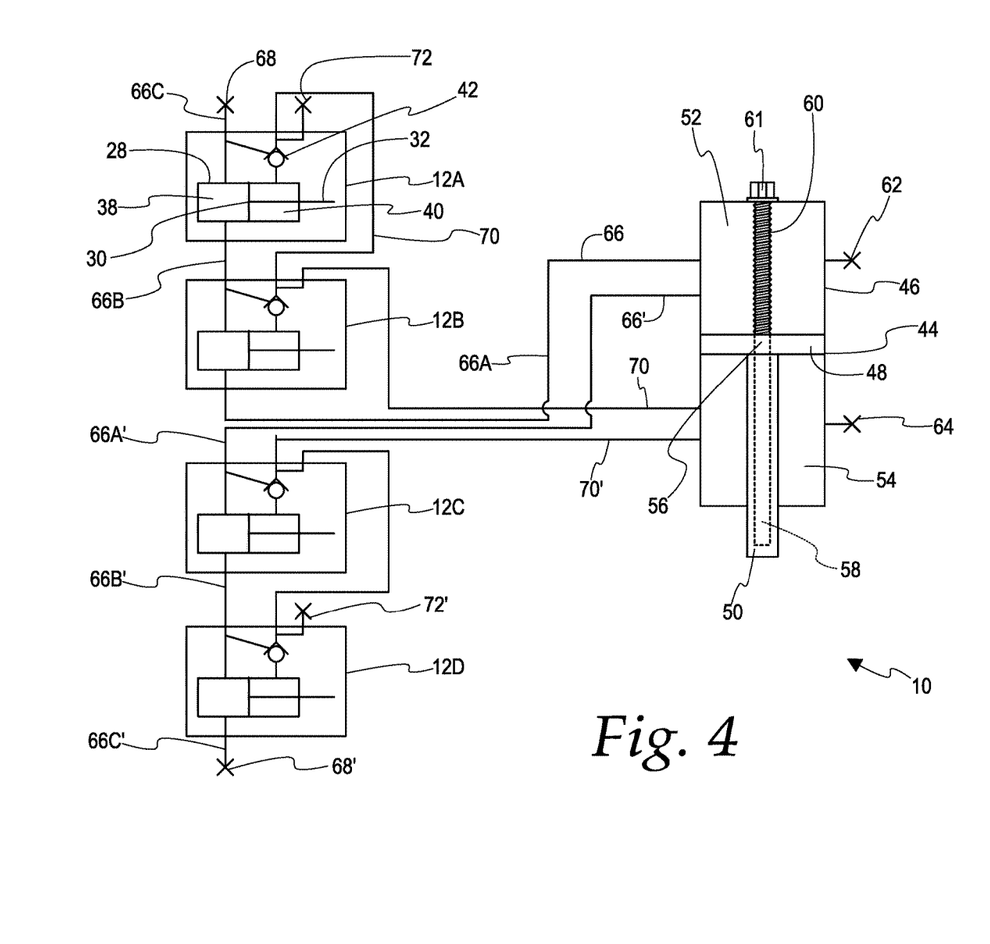
FIG. 4 is a hydraulic schematic diagram of a hydraulic stabilizing system configured to operate a plurality of hydraulically-operated stabilizing jacks according to the present disclosure.

As best shown in FIG. 4, the actuator 20 includes an actuator cylinder 28 having a first end and a second end, an actuator piston 30 slidably engaged within the actuator cylinder, and an actuator piston rod 32 connected to the actuator piston.

The actuator piston rod 32 is extendable and retractable with respect to the actuator cylinder 28 through an end cap of the actuator cylinder in response to displacement of the actuator piston 30 within the actuator cylinder. One skilled in the art would recognize that extension of the actuator piston rod 32 from the actuator cylinder 28 would cause the leg 24 to articulate so that the second end of the leg (and the foot 26 connected thereto) extends from the base 14, and that retraction of the actuator piston rod into the actuator cylinder would cause the leg to articulate so that the second end of the leg (and the foot connected thereto) retracts toward the base.

The actuator cylinder 28 and the actuator piston 30 cooperate to define an actuator first chamber 38 (which may sometimes be referred to herein as the actuator extend chamber or the non-rod side of the actuator piston) and a actuator second chamber 40 (which may sometimes be referred to herein as the actuator retract chamber or the rod side of the actuator piston).

A pilot-operated check valve 42 having first and second flow ports is connected to the actuator retract chamber 40 with the flow ports in fluid communication therewith. The pilot-operated check valve 42 further has a pilot port in fluid communication with a corresponding hydraulic extend line, as will be discussed further below.

The actuator extend chamber 38 has a maximum volume defined by the interior of the actuator cylinder 28 and the free surface of the actuator piston 30 when the actuator piston rod 32 is fully extended from the actuator cylinder (or when the actuator piston is fully displaced toward the second end of the actuator cylinder). The actuator retract chamber 40 has a maximum volume defined by the interior of the actuator cylinder 28, the surface of the actuator piston 30 to which the actuator piston rod 32 is attached, and the actuator piston rod when the actuator piston rod is fully retracted into the actuator cylinder (or when the actuator piston is fully displaced toward the first end of the actuator cylinder). An actuator volume ratio (or actuator rod head ratio) may be defined by the maximum actuator retract chamber volume divided by the maximum actuator extend chamber volume.

Figure 5A:
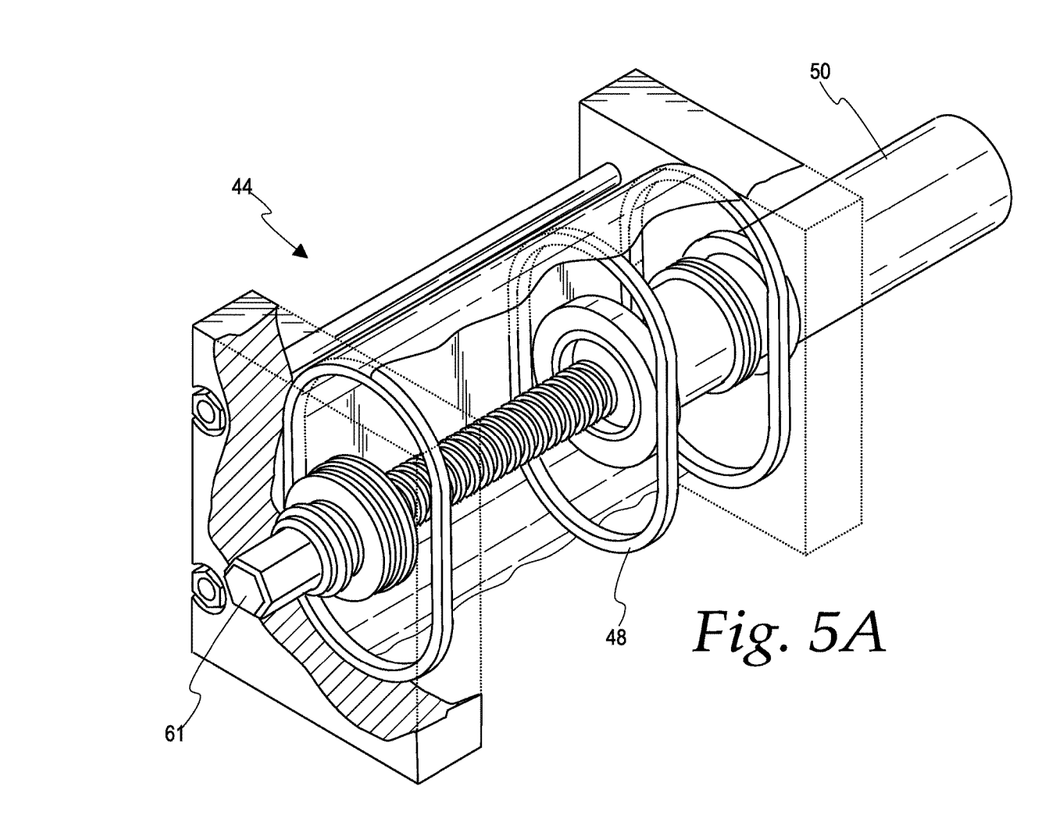
FIG. 5A is a perspective partial phantom view of a fluid transfer pump according to the present disclosure.
Figure 5B:
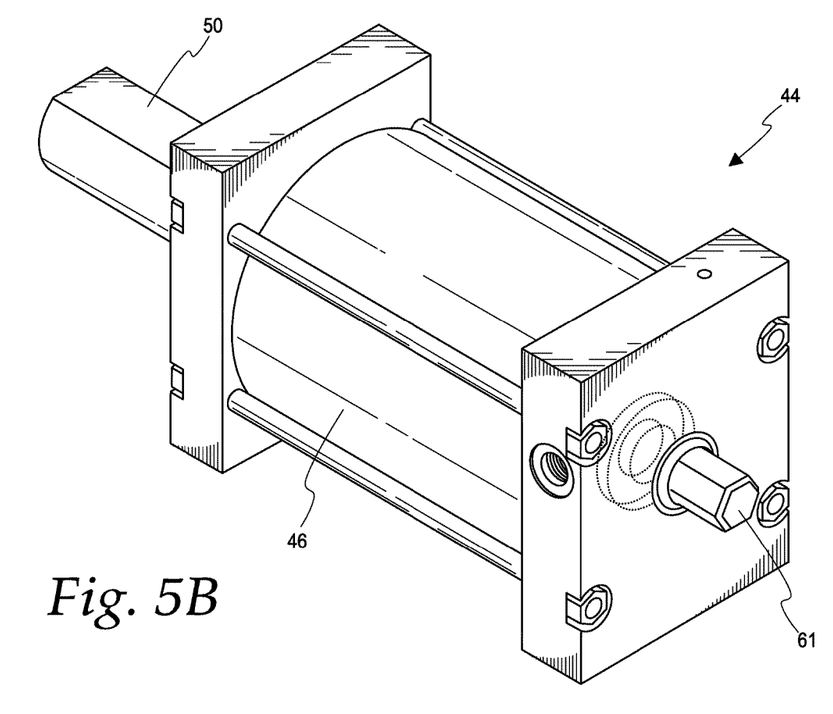
FIG. 5B is a perspective view of a fluid transfer pump according to the present disclosure.
Figures 5C, 6:
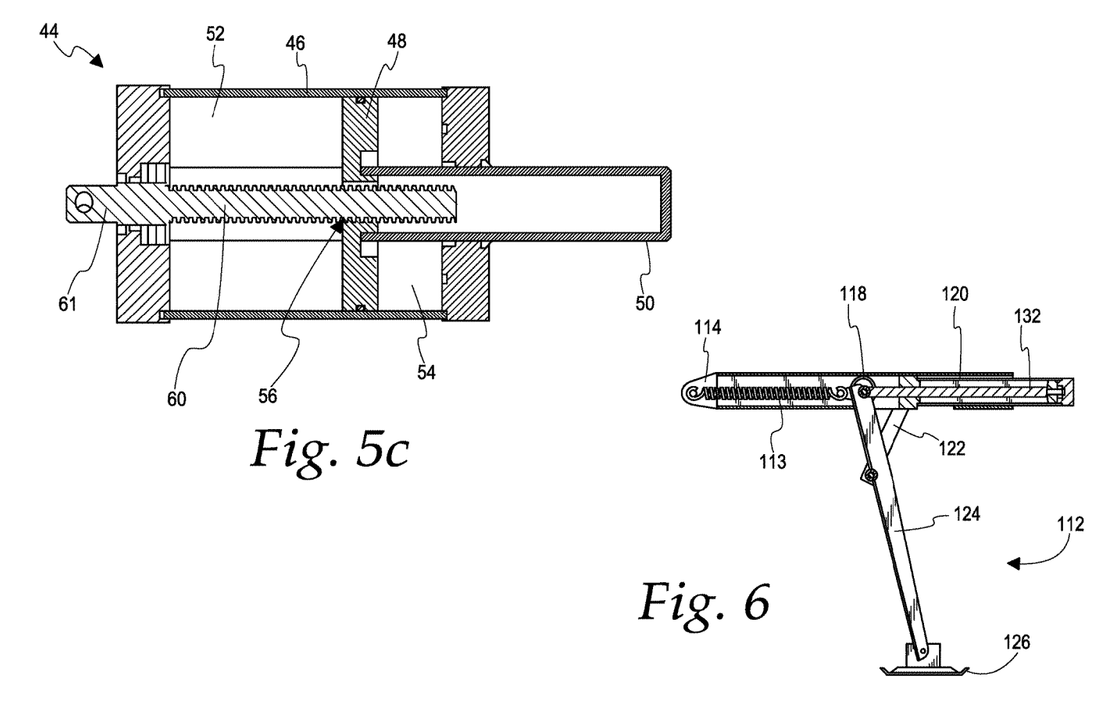
FIG. 5C is a side cross sectional view of a fluid transfer pump according to the present disclosure.
FIG. 6 is a cross-sectional side view of another hydraulically-operated stabilizing jack according to the present disclosure.

The system 10 incudes a fluid transfer pump 44 configured to selectively provide hydraulic fluid to, and selectively receive hydraulic fluid from the actuator extend chamber 38 and the actuator retract chamber 40. As best shown in FIGS. 5A-5C, the pump 44 includes a pump hydraulic cylinder 46 having a first end and a second end, a pump piston 48 slidably engaged within the pump cylinder, and a pump piston rod 50 connected to the pump piston. The pump cylinder 46 and the pump piston 48 cooperate to define a pump first chamber 52 (which may sometimes be referred to herein as the pump extend chamber or the non-rod side of the pump piston) and an actuator second chamber 54 (which may sometimes be referred to herein as the pump retract chamber or the rod side of the pump piston).

The pump piston rod 50 is connected to and extends from one side (the rod side) of the pump piston 48 and through an end cap of the pump cylinder 46. The pump piston rod 50 is connected to the pump piston 48 in a fluid-tight manner, for example, by a continuous weld. The pump piston rod 50 is extendable and retractable with respect to the pump cylinder 46 through an end cap of the pump cylinder in response to displacement of the pump piston 48 within the pump cylinder. In an embodiment, the pump piston rod 50 may be omitted. In another embodiment, the fluid transfer pump 44 may be, for example, any other suitable form of positive displacement pump.

The pump piston 48 defines a hole 56 extending axially therethrough and coaxial with the pump piston rod 50. The hole 56 in the pump piston 48 is internally threaded and configured for threaded engagement with a drive screw 60. The drive screw 60 is externally threaded and configured for threaded engagement with the internal threads of the hole 56. The pump piston rod 50 defines a blind hole 58 extending partially and axially therethrough from the end thereof coextensive with the pump piston 48. The blind hole 58 in the pump piston rod 50 communicates with the hole 56 in the pump piston 48 and with the pump extend chamber 52. The clearance between the threads of the drive screw 60 and those of the hole 56 in the pump piston 48 is sufficient to permit passage of hydraulic fluid therebetween and to thereby preclude hydraulic locking of the drive screw 60 with respect to the pump piston rod 50. As shown, the free end of the drive screw 60 is embodied as (or fitted with) a drive head 61, for example, a hex head, for engagement with an operator, for example, a hand tool or a power tool having a complementary head. In an embodiment, the free end of the drive screw 60 or the drive head 61 could be connected to a bi-directional electric motor (not shown).

As shown in FIG. 5A, the pump cylinder 46 and the pump piston 48 may have an oval or other non-round cross-section so that the pump piston is keyed to the pump cylinder in non-rotational engagement. Alternatively, as shown in FIG. 5B the pump cylinder 46 and the pump piston 48 could have a round cross-section, and the pump piston rod 50 and the complementary opening in the end cap of the pump cylinder 46 could have complementary shapes. In other embodiments, the pump cylinder 46 and the pump piston 48 could be keyed together in other ways.

A pump extend chamber fill/bleed port 62 penetrates the pump cylinder 46 to allow selective fluid communication between the pump extend chamber 52 and the environment (which environment may include a receptacle for receiving hydraulic fluid bled from the pump extend chamber bleed port). A pump retract chamber bleed port 64 penetrates the pump cylinder 46 to allow selective fluid communication between the pump retract chamber 54 and the environment.

The pump extend chamber 52 has a maximum volume defined by the interior of the pump cylinder 46 and the free surface of the pump piston 48 when the pump piston rod 50 is fully extended from the pump cylinder (that is, when the pump piston is fully displaced toward the second end of the pump cylinder). The pump retract chamber 44 has a maximum volume defined by the interior of the pump cylinder 46, the surface of the pump piston 48 to which the pump piston rod 50 is attached, and the pump piston rod when the pump piston rod is fully retracted into the pump cylinder (that is, when the pump piston is fully displaced toward the first end of the pump cylinder). A pump volume ratio (or pump rod head ratio) may be defined by the maximum pump retract chamber 54 volume divided by the maximum pump extend chamber 52 volume.

In an embodiment, the pump volume ratio is substantially similar to the actuator volume ratio of the actuators 20 of all of the jacks 12n collectively. More specifically, the pump extend chamber 52 volume may be substantially similar to the sum of the actuator extend chamber 38 volumes of the individual jacks 12n, and the pump retract chamber 54 volume may be substantially similar to the sum of the actuator retract chamber 40 volumes of the individual jacks 12n. In an embodiment wherein the actuators 20 of all of the individual jacks 12n are identical, the pump volume ratio is substantially similar to the jack volume ratio of the individual actuators 20 of the jacks 12n.

In another embodiment, the pump volume ratio may be greater than the jack volume ratio of the actuators 20 of the jack 12n collectively. In such an embodiment, the pump retract chamber 54 volume would be greater than the sum of the actuator retract chamber 40 volumes of the actuators 20 of the individual jacks 12n, and the pump extend chamber 52 volume of the pump would be lesser than the sum of the actuator extend chamber 38 volumes of the actuators of the individual jacks. In such an embodiment, over-retraction of the pump piston rod 50 could result in vacuum being drawn in the pump retract chamber 54, thus causing the hydraulic fluid therein and/or in the corresponding actuator retract chambers 40 (and/or in the corresponding retract lines connecting the pump retract chamber with the actuator retract chambers, as will be discussed below) to displace entrained air or "boil." Also in such an embodiment, even full extension of the pump piston rod 50 may fail to transfer sufficient hydraulic fluid from the pump extend chamber 52 to the actuator extend chambers 38 of the actuators 20 of all of the jacks 12$n$ to fully extend the actuator piston rods 32 thereof.

In a further embodiment, the pump volume ratio may be lesser than the jack volume ratio of the actuators 20 of the jacks 12$n$ collectively. In such an embodiment, the pump extend chamber 52 volume would be greater than the sum of the actuator extend chamber 38 volumes of the actuators 20 of the individual jacks 12$n$, and the pump retract chamber 54 volume would be lesser than the sum of the actuator retract chamber 40 volumes of the actuators 20 of the individual jacks. In such an embodiment, the pump extend chamber 52 may contain a substantial amount of surplus hydraulic fluid, even when the actuator extend chambers 38 of the actuators 20 of all of the jacks 12$n$ are completely filled with hydraulic fluid. As such, continued operation of the pump in the extend direction may overpressurize and cause failure of extend hydraulic lines connecting the pump extend chamber 52 with the actuator extend chambers 38 or other intervening components. Also, even full extension of the pump piston rod 50 may fail to transfer sufficient hydraulic fluid from the extend chambers 38 of the actuators 20 of all of the jacks 12$n$ to the extend chamber of the pump to fully retract the pump piston rods 24.

As shown in FIG. 4, the system 10 may be configured so that the actuators 20 of the first and second jacks 12A, 12B are controlled by a first hydraulic circuit, and so that actuators of the third and fourth jacks 12C, 12D are controlled by a second hydraulic circuit.

The first hydraulic circuit includes a first hydraulic circuit extend line 66 connecting the pump extend chamber 52 with the respective extend chambers 38 of the actuators 20 of the first and second jack actuators 12A, 12B, with the respective pilot ports of the pilot-operated check valves 42 of the first and second jack actuators, and with a first extend line bleed port 68 in fluid communication. The first extend line bleed port 68 may be opened and closed using a removable cap or a bleed valve to facilitate filling and bleeding of the first hydraulic circuit. As shown in FIG. 4, the first hydraulic circuit extend line 66 may be provided in segments, with a first segment 66A connecting the pump extend chamber 52 with the extend chamber 38 of the actuator 20 of the second jack actuator 12B, a second segment 66B connecting the extend chamber 38 of the actuator 20 of the second jack 12B with the extend chamber 38 of the actuator 20 of the first jack 12A and with the pilot port of the pilot-operated check valve 42 of the actuator 20 of the second jack 12B, and a third segment 66C connecting the extend chamber 38 of the actuator 20 of the first jack 12A with the pilot port of the pilot-operated check valve 42 of the first jack 12A and also with the first extend line bleed port 68. In other embodiments, the first hydraulic circuit extend line 66 may interconnect the foregoing components in any suitable manner.

The first hydraulic circuit also includes a first hydraulic retract line 70 connecting the pump retract chamber 54 with respective flow ports of the pilot-operated check valves 42 of the first and second jack actuators 12A, 12B and with a first retract line bleed port 72 in fluid communication.

The second hydraulic circuit includes analogous second hydraulic circuit extend and second hydraulic circuit retract lines hydraulically coupling the pump 44 with the actuators 20 of the third and fourth jacks 12C, 12D in an analogous manner. In the drawings, such analogous extend and retract lines and other analogous hydraulic system components are identified using primed reference characters corresponding to those used above in connection with the first hydraulic circuit.

In use, rotation of the drive screw 60 in a first direction causes the pump piston 48 to be displaced so as to force hydraulic fluid from the pump extend chamber 52 into the first and second hydraulic circuit extend lines and the extend chamber 38 of each of the actuators 20$n$. Initially, the fluid pressure in the extend portion of the system (including the pump and actuator extend chambers and the corresponding extend lines) may be below the set point pressure of the pilot-operated check valve 42 of any or all of the actuators 20$n$. If so, the respective pilot-operated check valve 42$n$ checks flow out of the respective actuator retract chamber 40$n$, thereby precluding displacement of the respective actuator piston 30$n$.

With the pilot-operated check valve 42 of any of the actuators 20 in this state, hydraulic fluid cannot appreciably flow between the pump 44 and the respective actuator 20. Continued rotation of the drive screw 60 eventually causes the fluid pressure in the corresponding extend lines to rise to and above the set point pressure of the respective pilot-operated check valve 42, thus unseating the pilot-operated check valve plug or disc and thereby allowing displacement of the respective actuator piston 30 and flow of hydraulic fluid out of the respective actuator retract chamber 40, through the corresponding retract line, and into the pump retract chamber 54. Consequently, hydraulic fluid is received in the actuator extend chamber 38 from the pump extend chamber 52, and the actuator piston rod 32 extends from the respective actuator cylinder 28, thereby retracting the leg 24 of the jack 12 toward the base 14 of the jack. When the drive screw 60 stops rotating, the pressure in the extend lines falls below the pilot-operated check valve 42 setpoint pressure and the pilot-operated check valve plug or disc engages with its seats, thereby checking further discharge of hydraulic fluid from the actuator retract chamber 40.

During the foregoing extend operation, the actuator piston 28 of one of the first and second jacks 12A, 12B may bottom out in the respective actuator cylinder 28 before the actuator piston of the other of the first and second jacks bottoms out in the respective actuator cylinder. Because the extend chambers 38 of the first and second actuators 20A, 20B are connected together in fluid communication, the actuator piston 30 of the other of the first and second jack actuators can continue to extend until it, too, bottoms out.

Rotation of the drive screw 60 in a second direction causes the pump piston 48 to be displaced so as to force fluid out of the pump retract chamber 54 into the corresponding retract lines and into the actuator retract chambers 40 of each of the actuators 20. Consequently, the actuator piston 30 is displaced so as to force hydraulic fluid out of the actuator extend chamber 40, and the actuator piston rod 32 retracts into the respective actuator cylinder 28, thereby extending the leg 24 of the jack 12 away from the base 14 of the jack. When the drive screw 60 stops rotating, the plugs of the pilot-operated check valves 42 engage with their seats and check discharge of hydraulic fluid from the jack retract chambers 40.

During the foregoing retract operation, the leg 24 of one of the first and second jacks 12A, 12B may bear against the ground before the leg of the other of the first and second jacks bears against the ground. Because the retract chambers 40 of the first and second actuators 20A, 20B are connected together in fluid communication, the leg 24 of the other of the first and second jack actuators 12A, 12B can continue to extend until it, too, bears against the ground. When the legs 24 of both the first and second jacks 12A, 12B have come into bearing against the ground, further displacement of the corresponding actuator pistons 30 is inhibited. Once displacement of the actuator piston 30 has halted, flow of hydraulic fluid from the pump extend chamber 52 to the actuator extend chamber 38 is halted, and the plug or disc of the pilot-operated check valve 42 is seated. (Displacement of the actuator piston 30 may be halted by ceasing rotation of the drive screw 60, because the respective actuator pistons have bottomed out in the actuator cylinder 28, and/or because the respective jack legs 24 have bottomed out against the ground.

The third and fourth actuators 20C, 20D behave in a manner similar to the first and second actuators 20A, 20B.

Figure 7:
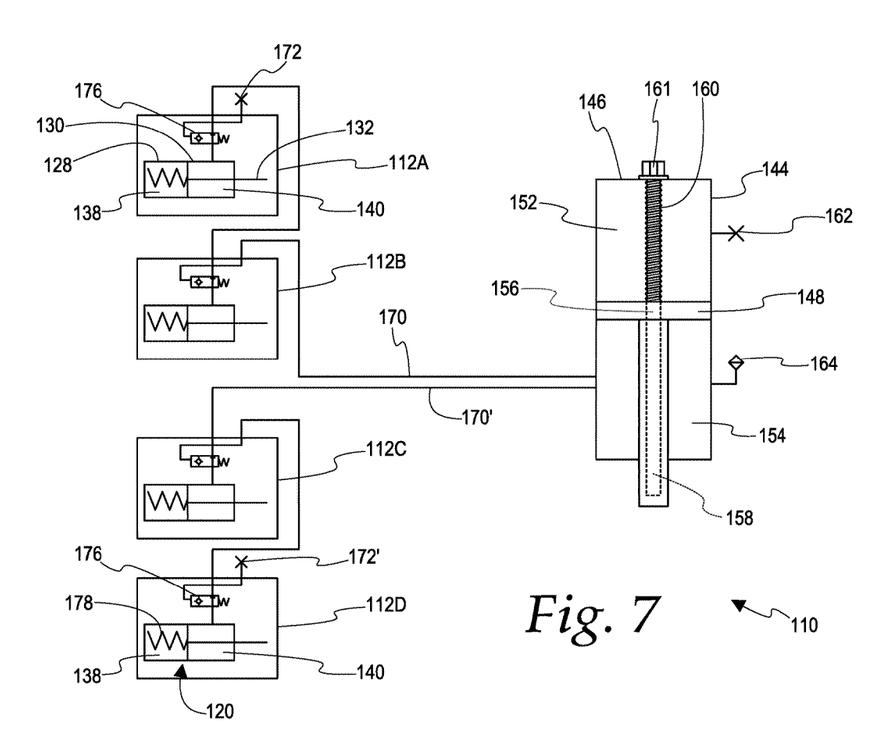
FIG. 7 is a hydraulic schematic diagram of another hydraulic stabilizing system configured to operate a plurality of hydraulically-operated stabilizing jacks according to the present disclosure.
Figure 8A:
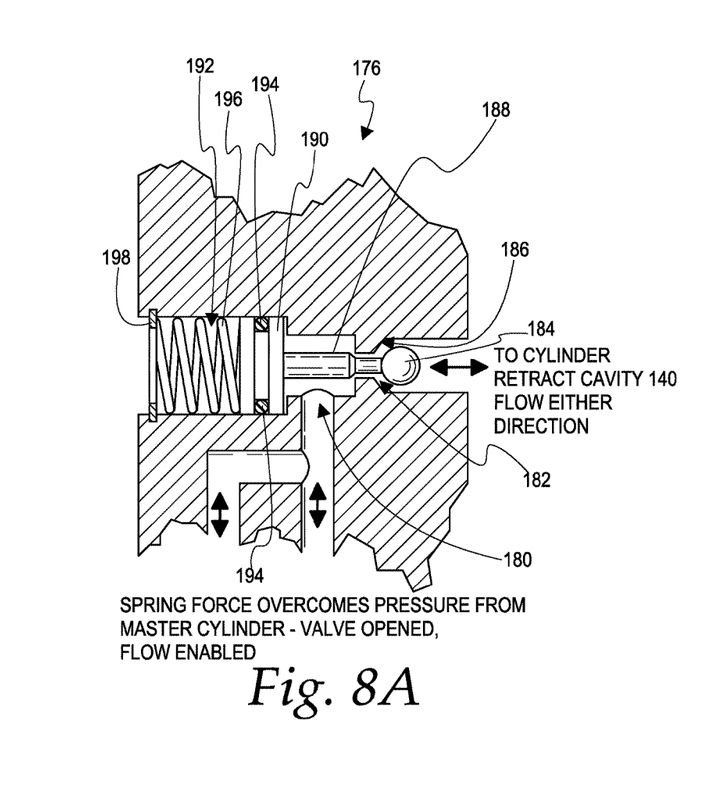
FIG. 8A is a cross-sectional view of an illustrative pilot-operated directional valve as may be used in the system of FIG. 7.
Figure 8B:
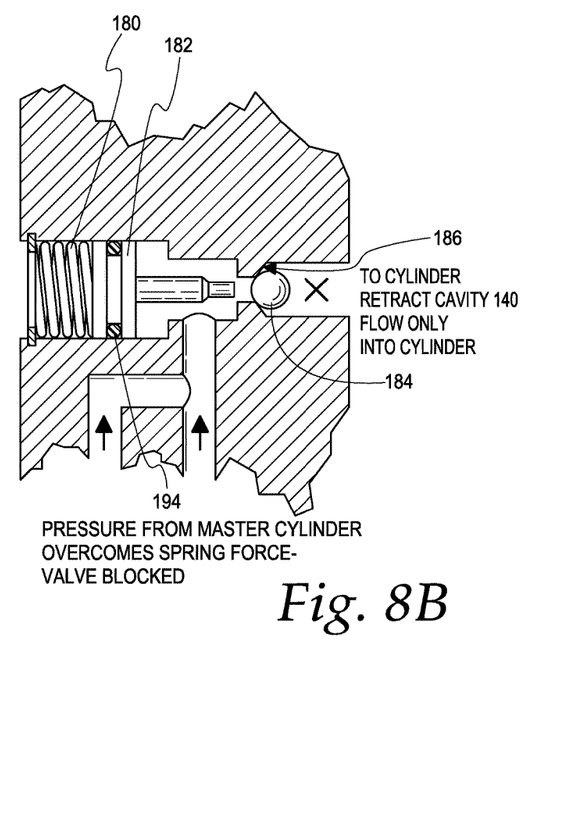
FIG. 8B is another cross-sectional view of an illustrative pilot-operated directional valve as may be used in the system of FIG. 7.

FIGS. 6-8 show another illustrative hydraulic stabilizing system 110 according to the present disclosure. As shown, the system includes four stabilizing jacks 112 that may be installed on an RV, trailer, or other vehicle. (The jacks 112 may be referred to herein individually as the first through fourth jacks 112A-112D or the jacks 112n and collectively as the jacks 112n. Similarly, the various components of the jacks 112n may be referred to herein individually or collectively by appending their respective reference characters in a similar manner.) In other embodiments, the system 110 may include more or fewer than four jacks 112n.

FIG. 6 shows an illustrative jack 112. The jack 112 is in most respects identical or analogous to the jack 12 described above. The components of the jack 112 that have identical or analogous counterparts in the jack 12 may be identified herein by like reference numbers, incremented by 100, and generally will not be discussed further. As such, the following discussion of the jack 112 generally is directed to differences between the jack 112 and the jack 12.

As shown in FIG. 6, the jack 112 may further include a biasing element 113 configured to bias the leg 122 of the jack to a retracted position. The biasing member 113 may be embodied as a helical tension spring connected between the base 114 and the trunnion 116 of the jack 112. In other embodiments, the biasing element 113 may be embodied in other ways.

Also, as best shown in FIG. 7, the actuator 120 of the jack 112 differs in some regards from the actuator 20 of the jack 12. The components of the actuator 120 that have identical or analogous counterparts in the actuator 20 may be identified herein by like reference numbers, incremented by 100, and generally will not be discussed further. As such, the following discussion of the actuator 120 generally is directed to differences between the actuator 120 and the actuator 20.

The non-rod side 138 of the actuator 120 need not be plumbed to receive or reject hydraulic fluid as is the non-rod side 38 of the actuator 20. Instead, the non-rod side 138 of the actuator 120 includes a biasing element 178, for example, a coil compression spring, acting against the non-rod side end of the actuator cylinder 128 and the non-rod side of the actuator piston 130. As such, the biasing element 178 biases the actuator piston 130 toward the rod-side end of the actuator cylinder. In an embodiment, the biasing element 178 could be compressed gas, for example, compressed air, sealed within the actuator extend chamber 138, or within a sealed container (not shown) disposed within the actuator extend chamber.

The actuator 120 does not include a pilot-operated check valve as does the actuator 20. Instead, the actuator 120 includes a pilot-operated directional valve 176. FIGS. 8A and 8B show an illustrative pilot-operated directional valve 176 including a first flow port 180 connected to the retract line 170 and a second flow port 182 connected to the corresponding actuator retract chamber 140. The valve 176 also includes a ball or plug 184 selectively engageable with a valve seat 186. The plug 184 may be selectively mechanically displaced off the valve seat 186 by an operator including a rod 188 connected to an operator piston 190 slidingly received within a bore 192 in the body of the valve 176. An O-ring 194 may be provided in connection with the piston 190 and the bore to effect a fluid-tight seal therebetween. For example, the O-ring 194 may be disposed in a groove defined by the outer circumference of the piston 190. A biasing spring 196 may be disposed between a face of the non-rod side of the piston 190 and a bearing surface 198.

As best shown in FIG. 8A, the biasing spring 196 is configured to bias the piston 190 and the attached rod 188 toward a first position in which the rod precludes the plug 184 from engaging with the seat 186. As best shown in FIG. 8B, the biasing force provided by the biasing spring 196 may be overcome by sufficient fluid pressure (the pilot-operated directional control valve setpoint pressure) in the corresponding retract line 170 applied to the rod side of the piston 190 so as to displace the piston and the rod 188 toward a second position in which the rod does not preclude the plug from engaging with the seat 186.

With the piston 190 in the first position and the plug 186 precluded from engagement with the seat 186, hydraulic fluid may flow between the retract line 170 and the actuator retract chamber 140 in both directions. With the piston 190 in the second position and the plug 186 not precluded from engagement with the seat 186, hydraulic fluid may flow from the retract line 170 to the actuator retract chamber 140, but not in the opposite direction.

In use, rotation of the drive screw 160 in a first direction causes the pump piston 148 to be displaced so as to draw hydraulic fluid from the actuator retract chambers 140 of the jacks 112A-112D through the corresponding retract lines 170 and into the pump retract chamber 154. If the fluid pressure in the retract line 170 initially is above the pilot-operated directional valve setpoint, the check valve piston 190 and rod 188 of each of the jacks 112A-112D initially will be in the second position and the corresponding plugs 184 may be engaged with the corresponding seats 186. The foregoing operation of the drive screw 152 will reduce the fluid pressure in the retract lines 170 to a pressure below the setpoint pressure. Consequently, the biasing springs 196 will displace the pistons 190 and the rods 188 to the first position, thereby disengaging the plugs 184 from the seats 186 and enabling flow of hydraulic fluid from the actuator retract chambers 140 of each of the jacks 112A-112D, through the retract lines 170, and into the pump retract chamber 154. As the hydraulic fluid is withdrawn from the actuator retract chambers 140, the biasing elements 138 and the reduced pressure in the actuator retract chambers cooperate to extend the actuator piston rods 132 from the actuator cylinders 128 and, therefore, to retract the jack legs 122 toward the jack bases 114.

Operation of the drive screw 160 in a second direction causes the pump piston 148 to be displaced so as to force hydraulic fluid out of the pump retract chamber 154, through the retract lines 170, and into the actuator retract chambers 140 of each of the jacks 112A-112D. Consequently, the actuator pistons 130 and pistons rods 132 are retracted into the corresponding actuator cylinders 128 and the jack legs 122 are extended from the jack base 114. When the jack leg 122 of one of the first jack 112A and the second jack 112B bottoms out against the ground, the corresponding actuator piston 130 and piston rod 132 stop moving appreciably, but hydraulic fluid continues to be provided to the actuator retract chamber of the other of the first jack and the second jack without an appreciable increase in hydraulic pressure in the corresponding retract line 170. When the jack leg 122 of the other of the first jack 112A and the second jack 112B bottoms out against the ground, its actuator piston 130 and piston rod 132 stop moving appreciably, and hydraulic pressure begins to build in the corresponding retract line 170. When the hydraulic pressure in the retract line 170 rises above the pilot-operated directional control valve setpoint pressure, the pistons 190 and piston rods 188 of the directional valves 176 move to the second state, thus enabling the plugs 182 to engage with the seats 184, thereby precluding back flow from the respective actuator retract chambers to the retract line 170.

The third and fourth jacks 112C, 112D operate in a similar manner.

The pump 144 is similar to the pump 44 except that the non-rod side 152 of the pump 144 is not plumbed to receive or reject hydraulic fluid 44 (the non-rod side of the pump 144 may be referred to herein as the dry side or dry chamber, and the rod side of the pump 144 may be referred to herein as the fluid side or fluid chamber). In an embodiment, the dry and fluid chambers of the pump 144 could be reversed. That is, the fluid chamber of the pump 144 could be on the non-rod side of the pump piston 148, and the dry chamber 142 could be on the rod side of the pump piston.

Figure 9:
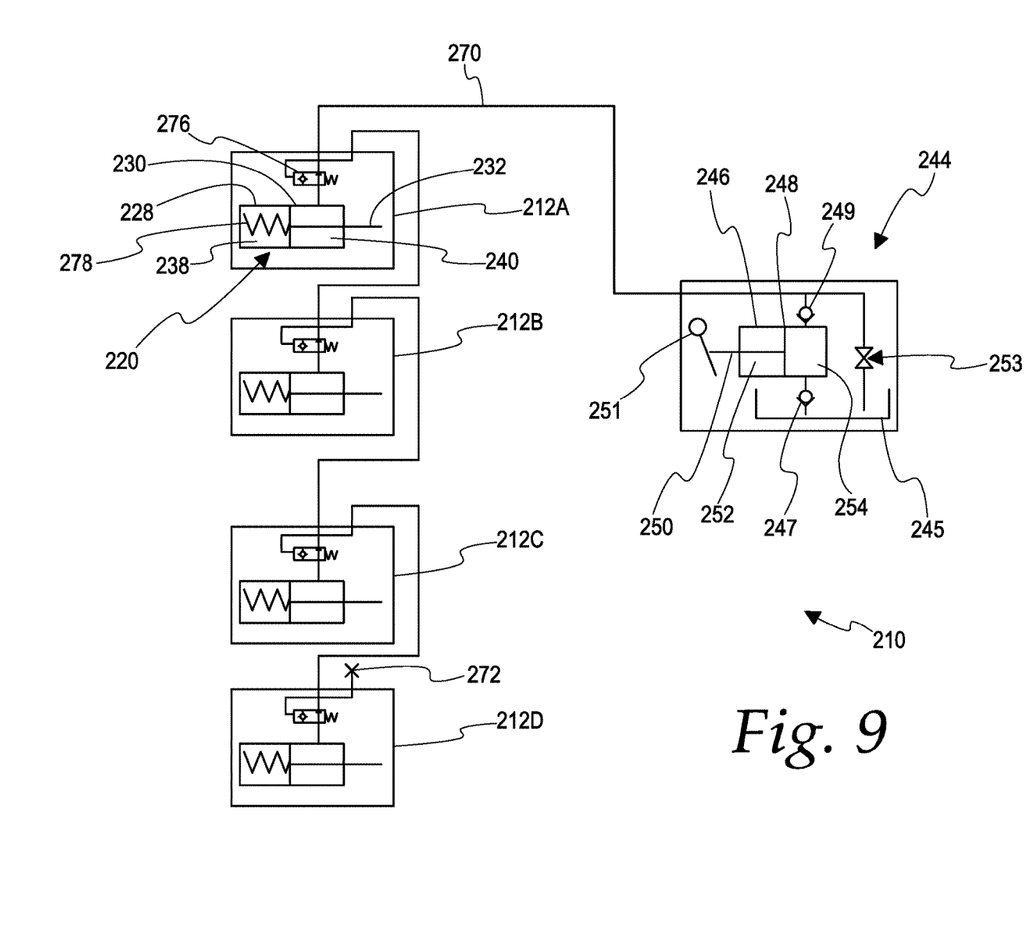
FIG. 9 is a hydraulic schematic diagram of a further illustrative hydraulic stabilizing system configured to operate a plurality of hydraulically-operated stabilizing jacks according to the present disclosure.

FIG. 9 shows a further illustrative hydraulic stabilizing system 210 according to the present disclosure. The system 210 is substantially similar to the system 110 in most regards. Features of the system 210 having direct counterparts in the system 110 are identified herein using like reference characters, incremented by 100. For example, the system 210 as shown includes four stabilizing jacks 212 similar or identical to the jacks 112 of the system 110.

The system 210 differs from the system 110 primarily in that the pump 244 of the system 210 is embodied as a reciprocating hand pump, whereas the pump 144 of the system 110 is embodied as a screw-operated pump.

The pump 244 includes a pump hydraulic cylinder 246 having a first end and a second end, a pump piston 248 slidably engaged within the pump cylinder, and a pump piston rod 250 connected to the pump piston. The pump cylinder 246 and the pump piston 248 cooperate to define a pump first chamber 252 (which may sometimes be referred to herein as the pump dry chamber or the rod side of the pump piston) and a pump second chamber 254 (which may sometimes be referred to herein as the pump fluid chamber or the non-rod side of the pump piston). The pump piston rod 250 is connected to and extends from one side (the rod side) of the pump piston 248. The pump piston rod 250 is extendable and retractable with respect to the pump cylinder 246 in response to displacement of a reciprocating pump actuator 251.

The pump 244 also includes a fluid reservoir 245, a first check valve 247 enabling selective fluid communication between the reservoir and the fluid chamber 254, a second check valve 249 enabling selective fluid communication between the fluid chamber and the retract chambers 240 of the actuators 212n, and a fluid control valve 253 enabling selective fluid communication between the retract chambers of the actuators and the reservoir.

In operation, with the control valve 253 closed, a user may operate the pump 244 by operating the reciprocating actuator 251 to withdraw the piston rod 250 from the cylinder 246, thereby moving the piston 248 so as to increase the volume of the fluid chamber 252, thereby decreasing the pressure in the fluid chamber. The pressure reduction tends to close or cause to remain closed the second check valve 249 to draw fluid from the reservoir 245 through the first check valve 247 into the fluid chamber 254. The user may further operate the reciprocating actuator 251 to retract the piston rod 250 into the cylinder 246, thereby moving the piston 248 so as to decrease the volume of the fluid chamber 254, thereby increasing the pressure in the fluid chamber. The pressure increase tends to close or cause to remain closed the first check valve 247 and to force fluid from the fluid chamber 254, through the second check valve 249, and into the retract chambers 240 of the actuators. The user may continue to operate the reciprocating actuator 251 as may be necessary to achieve a desired state of retraction of the actuator pistons 230 and actuator piston rods 232 into the actuator cylinders 228.

The user may open the control valve 253 to relive fluid from the retract chambers 240 of the actuators 212n to the reservoir 245.

Figure 10:
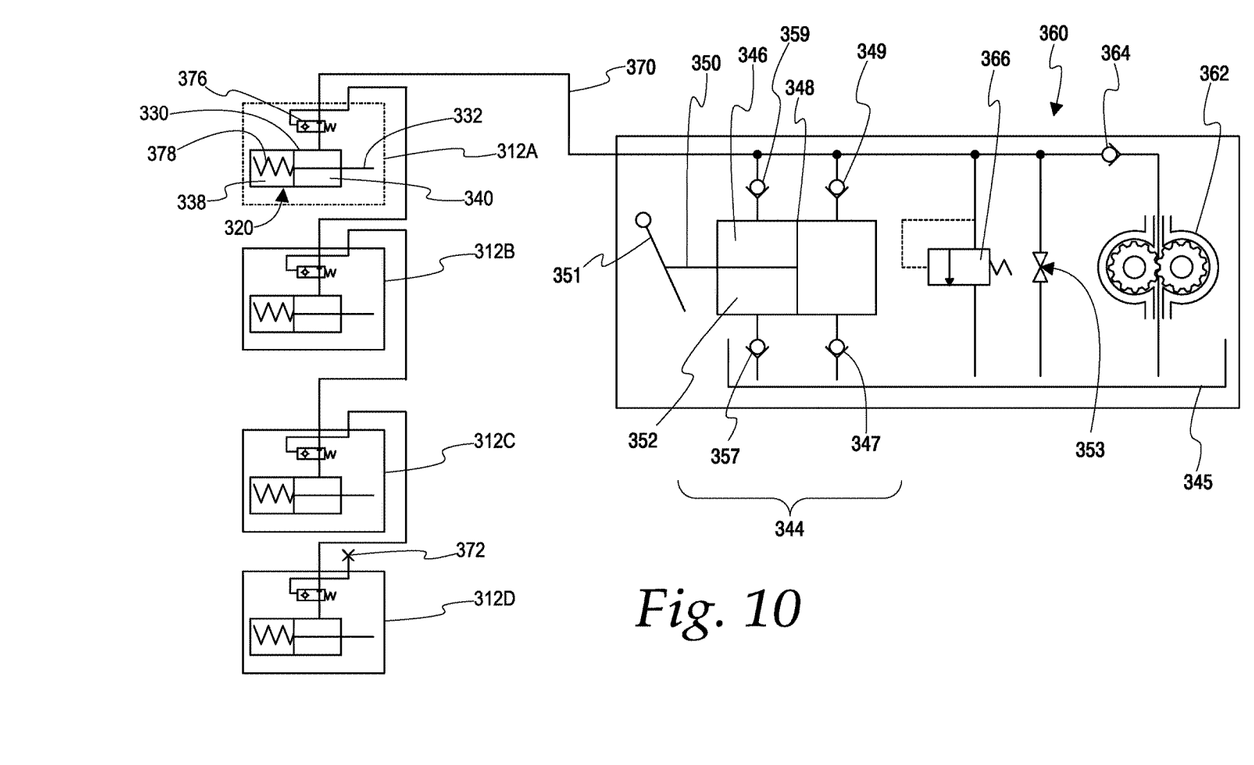
FIG. 10 is a hydraulic schematic diagram of yet another illustrative hydraulic stabilizing system configured to operate a plurality of hydraulically-operated stabilizing jacks according to the present disclosure.

FIG. 10 shows yet another illustrative hydraulic stabilizing system 310 according to the present disclosure. The system 310 is substantially similar to the system 210 in most regards. Features of the system 310 having direct counterparts in the system 210 are identified herein using like reference characters, incremented by 100. For example, the system 310 as shown includes four stabilizing jacks 312 similar or identical to the jacks 212 of the system 210.

The system 310 differs from the system 210 primarily in that the system 310 includes a pump system 360 including both a reciprocating hand pump 344 and a gear pump 362 (or other rotary positive displacement pump) connected in parallel between the reservoir 345 and the retract chambers 340 of the actuators 312n.

The hand pump 344 of the system 310 differs from the hand pump 244 of the system 210 in that the hand pump 344 is double acting. That is, the pump first chamber 352 of the pump 344 also is a fluid chamber configured to selectively draw hydraulic fluid from the reservoir 345 and discharge the hydraulic fluid to the retract chambers 340 of the actuators 312n. As such, the pump 344 also includes a third check valve 357 enabling selective fluid communication between the reservoir 345 and the pump first chamber 352 and a third check valve 359 enabling selective fluid communication between the pump first chamber and the retract chambers 340 of the actuators 312n.

The gear pump 362 may include a pump shaft (not shown) and a drive head (not shown) connected to the pump shaft. The drive head may be engaged by a tool having a complementary drive head configured to turn the pump shaft. The tool may be a hand crank, a power tool, for example, an electric drill, or a dedicated and permanently or semi-permanently installed motor.

The system 310 also includes a fifth check valve 364 connected between the gear pump 344 and the retract chambers 340 of the actuators 312n to preclude backflow of hydraulic fluid through the gear pump 362.

The system further includes a pressure relief valve 366 connected between the retract line 370 and the reservoir 345. The pressure relief valve 366 is configured to relieve hydraulic fluid from the retract line 370 to the reservoir 345 in the event the fluid pressure exceeds the pressure relief valve setpoint.

The system 310 may be operated in a manner similar to the system 310. The gear pump 362 may be used in lieu of the hand pump 344 to rapidly deploy the jacks 212n. The hand pump 344 may be better suited for making fine adjustments to the state of deployment of the jacks 212n.

In the embodiments illustrated and described herein, extension of the actuator piston rod 32, 132, 232, 332 causes the leg 24, 124, 224, 324 of the jack 12, 112, 212, 312 to retract, and retraction of the actuator piston rod causes the leg of the jack to extend. In other embodiments, this relationship could be reversed. For example, the actuator 20, 120, 220, 320 could be mounted to the base 14, 114, 214, 314 of the jacks 12, 112, 212, 312 so as to act on the opposite side of the trunnions 18, 118, 218, 318.

In such a reversed embodiment, the flow ports of the pilot-operated check valves 42 of the jack actuators 12n would be connected to the extend chambers 38 of the jack actuators and the corresponding extend lines, and the pilot ports of the pilot-operated check valves would be connected to the retract lines 70 in a reversal of the arrangement shown and described above.

Also, in such a reversed embodiment, the hydraulic pump 144, 244 or pump system 360 would communicate hydraulic fluid with the actuator extend chambers 138, 238, 338 instead of with the actuator retract chambers. Further, the flow ports of the pilot-operated directional valves 176, 276, 376 of the actuators 120n, 220n, 320n would be connected to the actuator extend chambers 138, 238, 338 and to corresponding extend lines, and the pilot ports of the pilot-operated directional check valves would be connected to the extend lines in a reversal of the arrangement shown and described above.

In other embodiments, the actuators 20n, 120n, 220n, 320n themselves could function as the jacks. More specifically, each of the actuators 20n, 120n, 220n could be mounted to the vehicle with the respective actuator cylinder 28, 128, 228, actuator piston 30, 130, 230, and actuator piston rod 32, 132, 232 oriented vertically. A foot (not shown) could be attached to the free end of the actuator piston rod 30, 132, 232, 332. In such embodiments, the flow ports of the pilot-operated valves 26, 176, 276 of the actuators 20n, 120n, 220n, 320n would be connected to the actuator extend chambers 38, 138, 238, 338 and to the corresponding extend lines, and the pilot ports of the pilot-operated check valves 26 (in embodiments using them) would be connected to the retract lines in a reversal of the arrangement shown and described above.

The illustrated embodiments of the systems 10, 110, 210, 310 include four stabilizing jacks 12n, 112n, 212n, 312n. Other embodiments could include more or fewer than four stabilizing jacks 12n, 112n, 212n, 312n. Also, the illustrated embodiments of the systems 10, 110 include two hydraulic circuits. Other embodiments could include more or fewer than two hydraulic circuits. Further, the illustrated embodiments of the systems 210, 310 include one hydraulic circuits. Other embodiments could include two or more hydraulic circuits.

In any of the foregoing embodiments, the hydraulic circuit is configured to allow equalization of pressure at each of the actuators 20n, 120n, 220n, 320n. This feature may inhibit any single jack 12n, 112n, 212n, 312n from taking on a disproportionate load that could cause the vehicle's frame to twist.

A pump system similar to the pump system 360 of the system 310 may be provided in lieu of the pumps 44, 144, 244 of the systems 10, 110, 210.

A gear pump similar to the gear pump 360 of the system 310 may be provided in lieu of the piston-type pumps 44, 144 of the systems 10, 110. Such a gear pump used in the system 10 would be bi-directional.

A pressure relief valve similar to the pressure relief valve 366 of the system 310 may be provided in connection with the pumps 44, 144, 244 of the systems 10, 110, 210.

Terms of orientation, for example, upper, lower, vertical horizontal, and the like as may be used herein should be construed to refer to relative rather than absolute orientation unless context clearly dictates otherwise.

The embodiments shown and describe herein are illustrative and not limiting. Features described in connection with a given embodiment may be included in other embodiments to the greatest extent possible. For example, without limitation, pilot-operated check valves could be provided as substitutes for the pilot-operated directional valves of the systems 110, 210, 310, and pilot-operated directional valves could be provided as substitutes for the pilot-operated check valves of the system 10. As another non-limiting example, a single-acting reciprocating pump could be provided as a substitute for the double-acting reciprocating pump of the system 310, and a double-acting reciprocating pump could be provided as a substitute for the single-acting reciprocating pump of the system 210.

The invention claimed is:

1. A hydraulic stabilizing system comprising:
   a plurality of hydraulic stabilizing jacks, each of said jacks having an actuator comprising:
   an actuator cylinder;
   an actuator piston slidingly engaged with said actuator cylinder, said actuator piston cooperating with said actuator cylinder to define an actuator extend chamber and an actuator retract chamber;
   an actuator piston rod connected to said actuator piston and selectively extendable from and retractable into said jack cylinder; and
   one of a pilot-operated check valve and a pilot-operated directional valve having a first flow port connected to one of said actuator retract chamber and said actuator extend chamber in fluid communication therewith;
   a fluid reservoir;
   a fluid transfer pump having an input in fluid communication with said fluid reservoir, wherein said fluid transfer pump is one of a reciprocating pump and a gear pump;
   a hydraulic line connecting an output of said pump with said one of said actuator retract chamber and said actuator extend chamber of at least one of said actuators and with a second flow port of said one of pilot-operated check valve and a pilot-operated directional valve of said at least one of said actuators; and
   a control valve operable to selectively establish fluid communication between said first hydraulic line and said fluid reservoir.

2. The system of claim 1 further comprising a pressure relief valve configured to selectively relieve fluid from said hydraulic line to said fluid reservoir.

3. The system of claim 1 wherein said fluid transfer pump is a gear pump.

4. The system of claim 3 further comprising a gear pump check valve configured to check flow from said hydraulic line to said reservoir through said gear pump.

5. The system of claim 3 further comprising a reciprocating pump, said reciprocating pump comprising:
a first fluid chamber having a first input in selective fluid communication with said fluid reservoir and a first output in selective fluid communication with said hydraulic line; and
a second fluid chamber having a second input in selective fluid communication with said fluid reservoir and a second output in selective fluid communication with said hydraulic line.

6. The system of claim 5 further comprising:
a first reciprocating pump check valve in selective fluid communication with said fluid reservoir and said second chamber, said first reciprocating pump check valve configured to allow flow from said reservoir to said second chamber when said pump piston is moved from said second chamber toward said first chamber and to check flow from said second chamber to said reservoir when said pump piston is moved from said pump first chamber toward said second chamber;
a second reciprocating pump check valve in fluid communication with said second chamber and said hydraulic line, said second reciprocating pump check valve configured to allow flow from said second chamber to said hydraulic line when said pump piston is moved from said first chamber toward said second chamber and to check flow from said hydraulic line to said second chamber when said pump piston is moved from said second chamber toward said first chamber;
a third reciprocating pump check valve in selective fluid communication with said fluid reservoir and said first chamber, said third reciprocating pump check valve configured to allow flow from said reservoir to said first chamber when said pump piston is moved from said first chamber toward said second chamber and to check flow from said second chamber to said reservoir when said pump piston is moved from said second chamber toward said first chamber;
a fourth reciprocating pump check valve in fluid communication with said first chamber and said hydraulic line, said fourth reciprocating pump check valve configured to allow flow from said first chamber to said hydraulic line when said pump piston is moved from said second chamber toward said first chamber and to check flow from said hydraulic line to said first chamber when said pump piston is moved from said first chamber toward said second chamber.

7. The system of claim 1, wherein said fluid transfer pump is a reciprocating pump comprising:
a first fluid chamber having a first input in selective fluid communication with said fluid reservoir and a first output in selective fluid communication with said hydraulic line; and
a second fluid chamber having a second input in selective fluid communication with said fluid reservoir and a second output in selective fluid communication with said hydraulic line.

8. The system of claim 7 further comprising:
a first reciprocating pump check valve in selective fluid communication with said fluid reservoir and said second chamber, said first reciprocating pump check valve configured to allow flow from said reservoir to said second chamber when said pump piston is moved from said second chamber toward said first chamber and to check flow from said second chamber to said reservoir when said pump piston is moved from said pump first chamber toward said second chamber;
a second reciprocating pump check valve in fluid communication with said second chamber and said hydraulic line, said second reciprocating pump check valve configured to allow flow from said second chamber to said hydraulic line when said pump piston is moved from said first chamber toward said second chamber and to check flow from said hydraulic line to said second chamber when said pump piston is moved from said second chamber toward said first chamber;
a third check valve in selective fluid communication with said fluid reservoir and said first chamber, said third reciprocating pump check valve configured to allow flow from said reservoir to said first chamber when said pump piston is moved from said first chamber toward said second chamber and to check flow from said second chamber to said reservoir when said pump piston is moved from said second chamber toward said first chamber;
a fourth reciprocating pump check valve in fluid communication with said first chamber and said hydraulic line, said fourth reciprocating pump check valve configured to allow flow from said first chamber to said hydraulic line when said pump piston is moved from said second chamber toward said first chamber and to check flow from said hydraulic line to said first chamber when said pump piston is moved from said first chamber toward said second chamber.

9. The system of claim 1 wherein said one of said pilot-operated check valve and pilot operated directional valve is configured to selectively enable and disable flow between said output of said pump and said one of said actuator retract chamber and said actuator extend chamber of said at least one of said actuators.

10. The system of claim 1 further comprising a biasing mechanism associated with the other of said actuator retract chamber and said actuator extend chamber of said at least one of said actuators, said biasing mechanism configured to bias said actuator piston of said at least one of said actuators from said one of said actuator retract chamber and said actuator extend chamber of said at least one of said actuators toward the other of said actuator retract chamber and said actuator extend chamber of said at least one of said actuators.

11. The system of claim 10 wherein said biasing mechanism is a spring.

12. The system of claim 1 further comprising a biasing mechanism associated with the other of said actuator retract chamber and said actuator extend chamber of said at least one of said actuators, said biasing mechanism configured to bias said actuator piston of said at least one of said actuators from said other of said actuator retract chamber and said actuator extend chamber of said at least one of said actuators toward said one of said actuator retract chamber and said actuator extend chamber of said at least one of said actuators.

13. The system of claim 1, each of said jacks further comprising:
a base defining a channel, the channel carrying a trunnion;
a leg having a first end and a second end, the first end operably connected to the trunnion; and
a strut pivotably connected to the base and to the leg,
wherein the actuator is configured to selectively displace the trunnion within the channel.

14. The system of claim 1, each of said jacks further comprising a foot attached to a free end of said actuator piston rod.

15. The system of claim 1 installed on a vehicle.

16. The system of claim 15, wherein said vehicle comprises four corners and said plurality of jacks comprises four jacks, each of said four jacks located at a corresponding one of said four corners.

17. The system of claim 1 configured to equalize pressure at each of said actuators.

* * * * *